United States Patent [19]
Hunt

[11] 3,791,368
[45] Feb. 12, 1974

[54] MULTIPURPOSE COOKING ASSEMBLY
[76] Inventor: William C. Hunt, 15488 Issaquah Hobart Rd., Issaquah, Wash. 98037
[22] Filed: Jan. 24, 1972
[21] Appl. No.: 220,313

[52] U.S. Cl. .............................. 126/25 A, 126/9 R
[51] Int. Cl. ........ A47j 37/00, F24b 3/00, F24c 1/16
[58] Field of Search .......... 126/25 R, 25 A, 9 R, 38

[56] References Cited
UNITED STATES PATENTS

| | | | |
|---|---|---|---|
| 1,284,299 | 11/1918 | Freeon | 126/25 R |
| 2,531,684 | 11/1950 | Jackson | 126/25 A |
| 3,094,113 | 6/1963 | Avila | 126/9 R X |
| 1,485,292 | 2/1924 | Popper | 126/9 R |
| 3,667,446 | 6/1972 | Morton | 126/9 R |

FOREIGN PATENTS OR APPLICATIONS

| | | | |
|---|---|---|---|
| 125,923 | 5/1919 | Great Britain | 126/38 |
| 322,959 | 9/1917 | Germany | 126/9 R |
| 150,515 | 6/1955 | Sweden | 126/38 |
| 760,976 | 11/1956 | Great Britain | 126/38 |

*Primary Examiner*—William F. O'Dea
*Assistant Examiner*—Harold Joyce
*Attorney, Agent, or Firm*—Roy E. Mattern, Jr.

[57] ABSTRACT

A portable multipurpose cooking assembly for outdoor cooking is used as a stove, griddle, toaster, pressure cooker, and charcoal broiler. It is contained in a single portable small carrying case weighing only a few pounds, inclusive of cooking fuel and accessories. The components are: a top cover and a bottom cover of the small carrying case which also serves as a pressurized cooker or oven; a base with pivotal supporting legs used during all cooking operations as a housing for heating units and support for other components; a solid griddle to provide a cooking surface placed on top of the base during cooking and placed inside the bottom cover when packed away; an open grill placeable either over the base or inside the bottom cover; a briquet carrier placed inside the base to hold charcoal and serve as a charcoal broiler tray; a propane burner assembly removably housed inside the base having a metal tube leading to a propane fuel source outside the base to provide the overall heating unit when cooking; a removable handle attachable to the side of the top cover when carrying the cooking assembly and also attachable to the griddle to easily transport prepared food to the table or other place of serving; and other accessories, such as: a wooden cutting board, insulated mitts, small spears and smoke chips, all placed within the multipurpose cooking assembly when transported.

3 Claims, 23 Drawing Figures

PATENTED FEB 12 1974 3,791,368

MULTIPURPOSE COOKING ASSEMBLY

BACKGROUND OF THE INVENTION

For most persons while on hunting, hiking, camping, boating trips and other outdoor activities, cooking equipment has not been available in convenient sizes and/or at reasonable costs to prepare food in a variety of ways or to prepare a varied menu such as they would do normally in their home kitchens. Although extensive cooking equipment is often installed in cruising boats, camping trailers, and in hunters' cabins, most persons who enjoy hunting, camping, and boating do not want such expensive and extensive equipment to bother with on a trip. Although numerous other portable cooking devices are offered most are limited to the practice of one, or perhaps two, types of cooking methods and it is impractical to carry numerous bulky cooking units on most outdoor trips.

There is, however, an increasing popularity of trying to prepare food outdoors, not only on trips, but also at home, and it is desirable to have a cooking assembly which could be used to prepare many types of food in several different ways using different cooking methods. Moreover, such a cooking assembly should be within the financial means of anyone who enjoys cooking outdoors, either at home or on pleasure outings.

SUMMARY OF THE INVENTION

For cooking outdoors, or anywhere, using various methods of cooking, a small hand carried portable multipurpose cooking assembly is provided which is conveniently packed within its own top and bottom enclosures which are also active components of the cooking assembly. To carry the cooking assembly, which weighs only a few pounds, a removable handle is attached to a top cover near its junction with a bottom cover and the entire cooking assembly is then transported like a suitcase would be handled.

To use the multipurpose cooking assembly, latches which hold the top cover and bottom cover together are opened and the two covers separated. A base is then removed, and its pivotal retractable legs are rotated to support it. The propane burner assembly is placed inside the base with its fuel passage tube extending through an opening in the side of the base for connection to a propane fuel cylinder. Such propane fuel cylinders are readily available commercially at nominal cost. After the burner and fuel supply are in operating position, the remaining components are optionally used depending on the cooking method selected. For example, the grill may be placed over the base to support containers in which food is heated or to directly support bread for toasting. The griddle is used instead of the grill, when food, such as eggs and pancakes, is prepared directly on its surface. The removable handle used in carrying the assembly is attached to the griddle to carry prepared food directly to the place of serving or to the table. The use of the griddle with its handle eliminates the need for other frying pans and platters. During baking, steaming, roasting, or smoking food, the bottom cover is placed directly over the propane burner assembly located in the base, and the grill is placed inside the bottom cover to position the food as the top cover is thereafter placed on the bottom cover and latched.

To charcoal broil food, the briquet carrier, with charcoal placed on it is positioned inside the base in place of the propane burner assembly. The briquet carrier is provided at each end with adjustable supports to seek a suitable level below the grill which is placed on the base above the briquets to hold the foods being broiled.

To add to the convenience of using the multipurpose cooking assembly, several accessory items are frequently used during the various types of cooking operations. These accessories are: insulated mittens, prepackaged wood chips used when smoking food, a wood cutting board, and small skewers to hold food. All these accessories and all components of this multipurpose cooking assembly, except the charcoal briquets, are readily enclosed together within the top and bottom cover during transport and storage, and all are easily removed for use.

DRAWINGS OF PREFERRED EMBODIMENT

The preferred embodiment of the multipurpose cooking assembly is illustrated in the accompanying drawings, wherein.

DESCRIPTION OF PREFERRED EMBODIMENT

Figure 17:
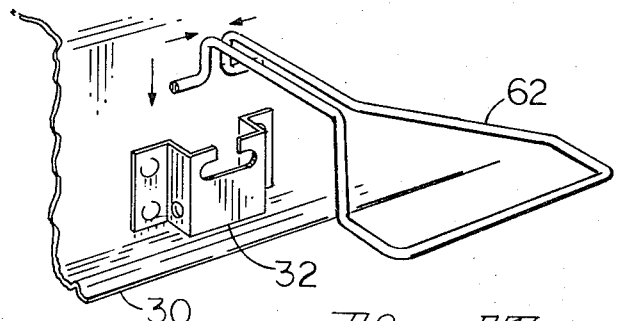
FIG. 17, is a perspective view of the handle and its attachment structure on the top cover, shown partially.
Figure 21:
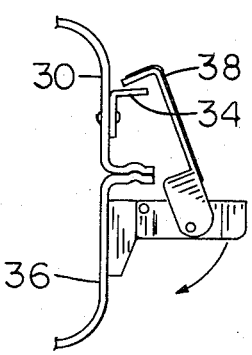
FIG. 21, is a partial view showing the latch and its operation to secure the top cover to the bottom cover.
Figure 22:
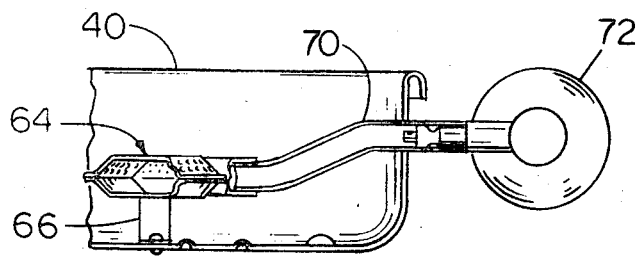
FIG. 22, is a partial side view of the base, propane burner assembly, and propane fuel cylinder, all assembled for use.

The preferred embodiment of the multipurpose cooking assembly 28 provides means for cooking food in a variety of ways at a minimal cost at almost any location for it is easily handled and conveniently transported from place to place with minimal effort. It is easily transported as its top cover 30 and bottom cover 36 are secured about the other components and all are then carried by using handle 62, which is removably secured to top cover 30. In FIG. 17, handle 62 is shown as it is about to be inserted into the handle attachment structure 32 on the top cover 30. As shown in FIG. 21, top cover 30 and bottom cover 36 are held together by using a latch anchor structure 34 located on the top cover 30 which is contacted by using the balance of the latch mechanism 38 secured on the bottom cover 36.

Figure 1:
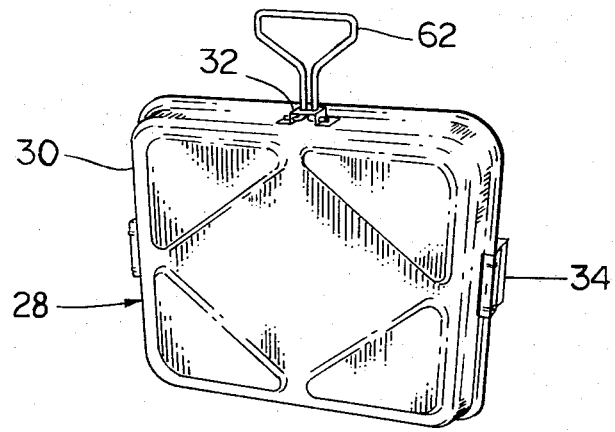
FIG. 1, is a perspective view of the multipurpose cooking assembly ready to be carried with the removable handle attached to the top cover.
Figure 2:
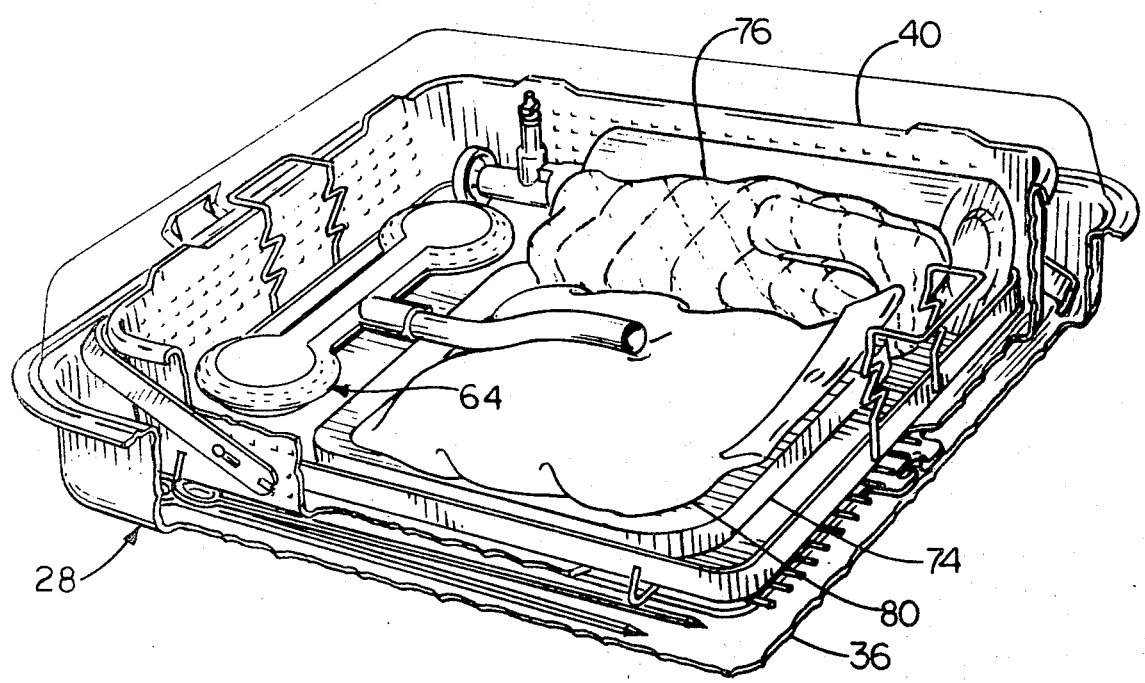
FIG. 2, is a perspective view of portions of the cooking assembly with the top cover and handle removed and with other portions broken away to reveal the component parts in their stored positions, including a propane burner and cylinder.
Figure 3:
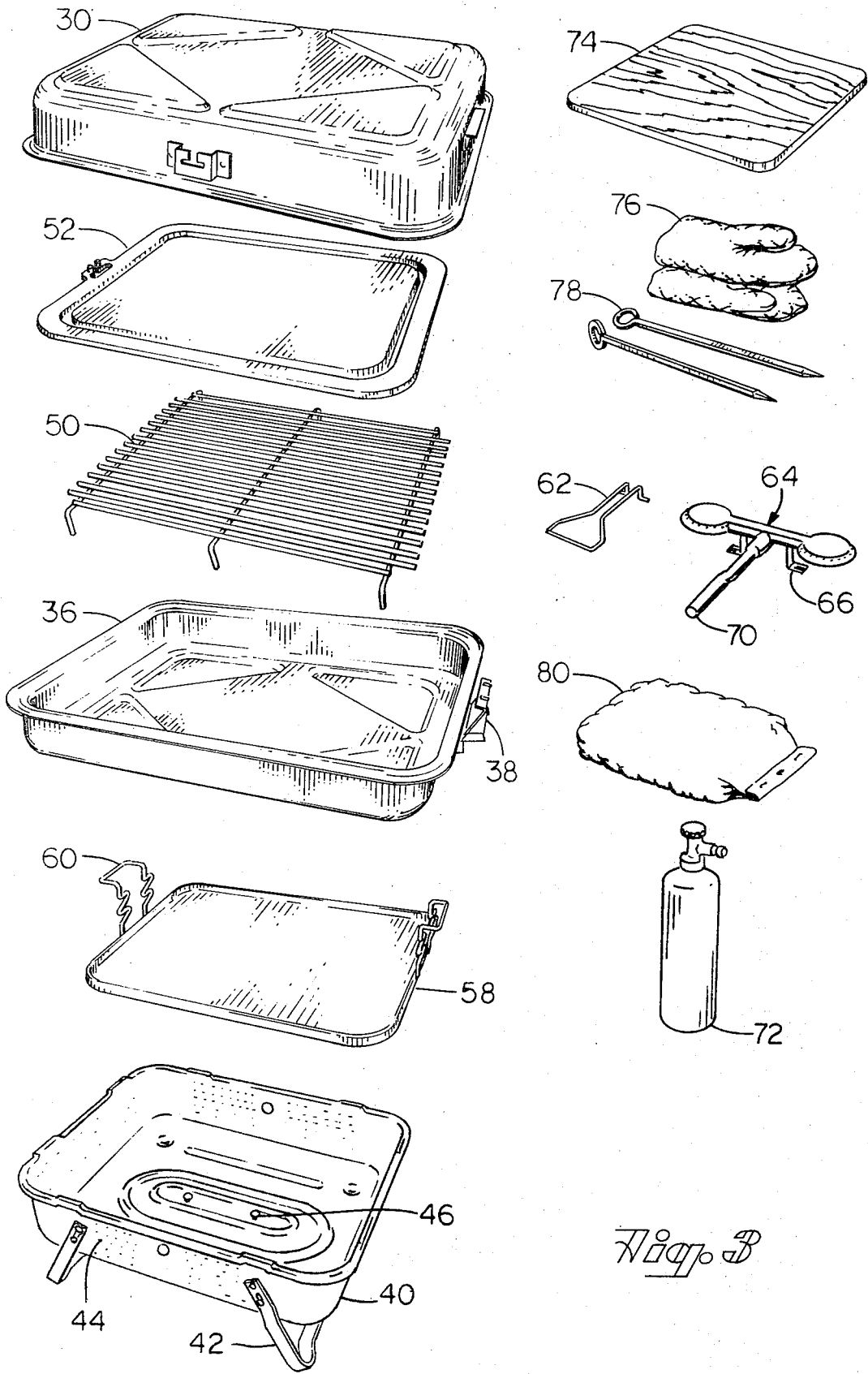
FIG. 3, is a composite view of each separate component of the cooking assembly when it is unpacked.
Figure 4:
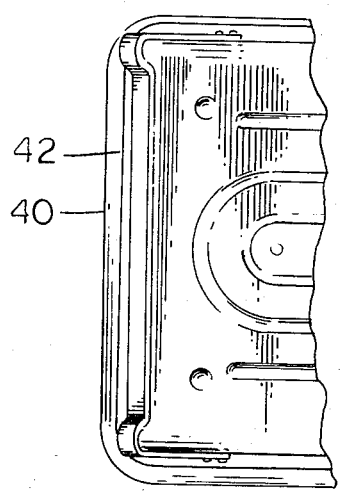
FIG. 4, is a partial bottom view of the base of the cooking assembly.
Figure 5:
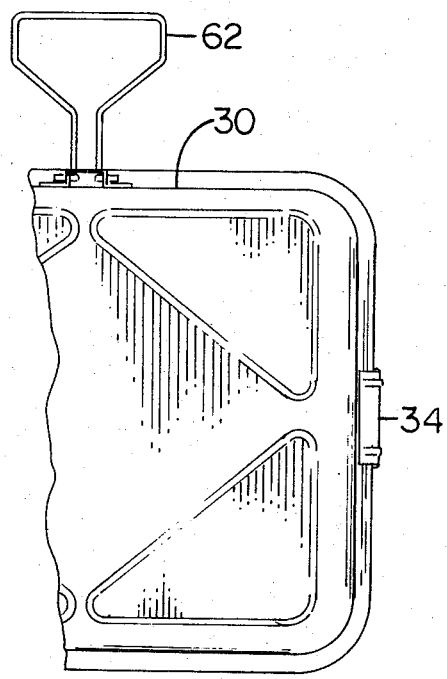
FIG. 5, is a partial top view of the top cover of the cooking assembly with the handle attached.
Figure 6:
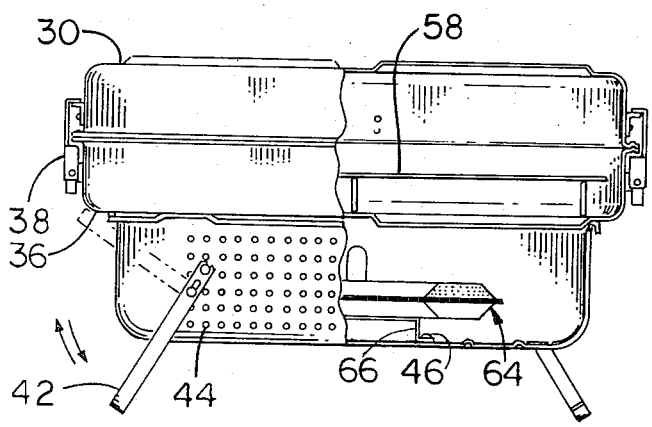
FIG. 6, is a side view with portions broken away to illustrate the cooking assembly arranged as a pressurized oven utilizing propane fuel.
Figure 9:
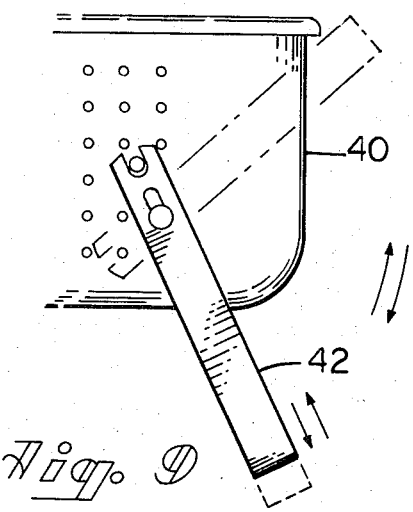
FIG. 9, is a partial side view of the base to show the adjustable and pivotal legs.
Figure 10:
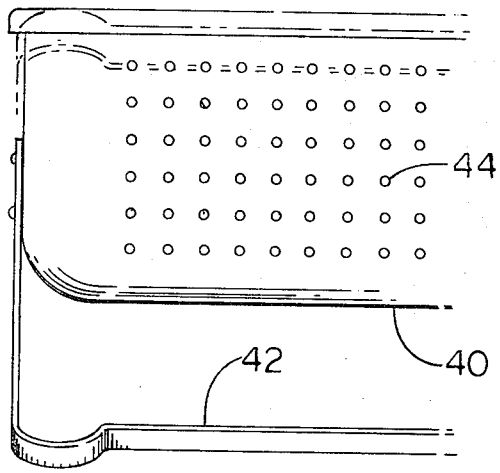
FIG. 10, is an end view of the base with the legs in the cooking position and showing ventilation holes in the sides of the base.
Figure 11:
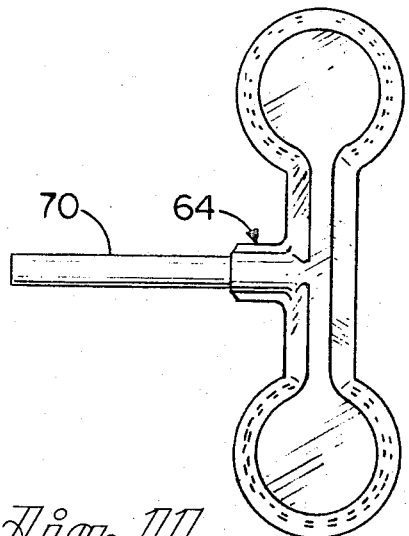
FIG. 11, is a top view of the propane burner assembly.
Figure 12:
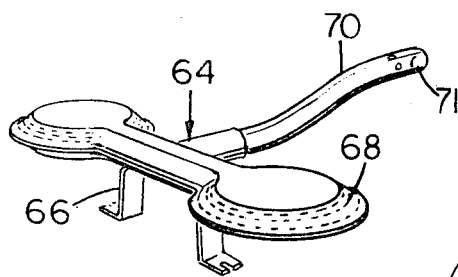
FIG. 12, is a perspective view of the propane burner assembly.
Figures 13, 14, 15:
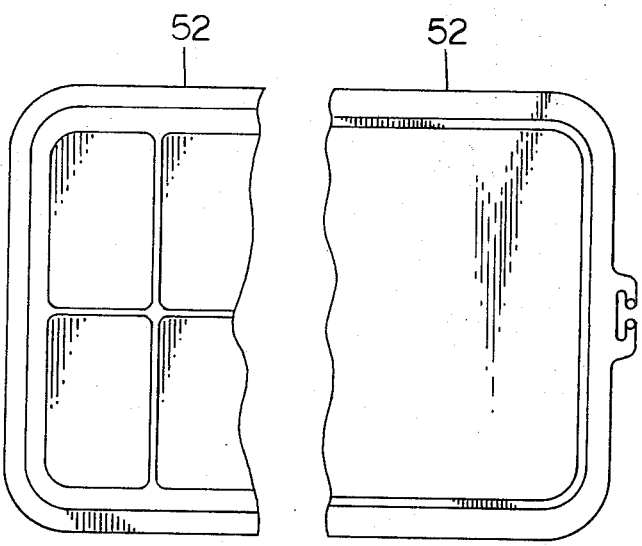
FIG. 13, is a perspective view of the top portions of the propane fuel bottle to show flattened sides of the insert portions which are placed in the intake tube of the propane burner assembly.
FIG. 14, is a partial bottom view of the griddle.
FIG. 15, is a partial top view of the griddle.

Whenever the use of the multipurpose cooking assembly 28 is undertaken, the top cover 30 is removed presenting the remaining components as shown in FIG. 2. Thereafter base 40 is separated from the other components, and its adjustable, pivotal legs 42 are rotated and secured to elevate the base a few inches above the ground level or a table surface, as shown in FIGS. 9 and 10. Noted also in these figures are ventilation holes 44 in the walls of base 40 which allow air to pass through the base for proper ventilation, and oxygen supply during the cooking periods.

Figure 23:
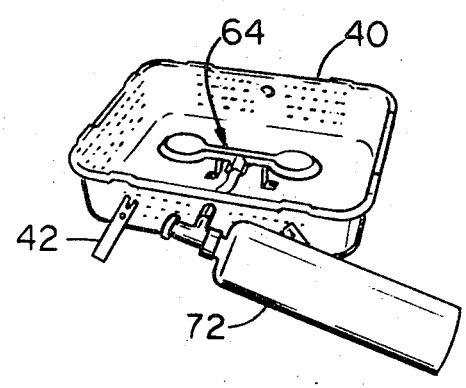
FIG. 23, is a perspective view of the base, propane burner assembly, and propane fuel cylinder all arranged for use.

When propane is the fuel heat source, the propane burner assembly 64 is inserted into the base 40 and held there both by the placement of portions of its legs 66 partially about anchors 46 which are in turn secured to the floor of the base 40, and also by having the tube 70, leading to the propane fuel bottle or cylinder 72, inserted through its passage hole in the side of the base 40. Thereafter the propane fuel bottle, cylinder or tank 72, commercially available for example under the trademark, "Bernz-O-Matic," is then attached to the tube 70 of propane burner assembly 64. These propane fuel bottles are designed with an outlet fitting 73 which has two flattened sides which complementarily fit the formed end 71 of tube 70 of the burner assembly 64. When the propane fuel bottle 72 is held with its longitudinal axis parallel to the ground, the parallel flat sides of its outlet fitting 73 enters tube 70. Thereafter, when the fuel cylinder 72 is lowered at one end to the ground or to a table, as shown in FIG. 23, the flattened portions of the outlet fitting 73, and the end opening of tube 70 are no longer aligned and they are effectively held together until counter rotation occurs. Propane gas, after turning of the valve on the cylinder 72, is then allowed to pass into tube 70 and be expelled through the holes 68 of the propane burner assembly 64. At these holes 68, the mixture of air and propane fuel is lighted as a match is placed near the holes 68. With these components in this operating position a person may then take advantage of the cooking method options which are available to him when using propane fuel.

Figure 7:
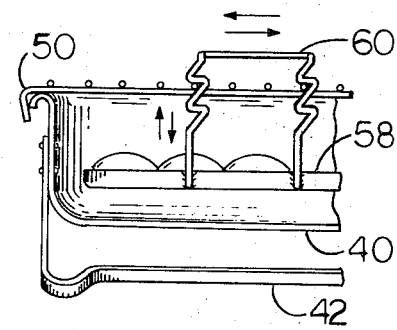
FIG. 7, is a partial end view of the base of the cooking assembly supporting a charcoal tray for broiling, with arrows indicating the adjustment of the charcoal briquet tray.

To use the multipurpose cooking assembly 28 as a stove or toaster, the grill 50 is positioned over the base 40 by sliding it from one end or the other as its depending portions partially overlap the base sides as shown in FIG. 7. The cooking containers may be placed on the grill 50 and/or food, such as bread, may be placed directly on the grill.

Figure 16:
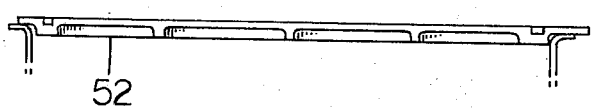
FIG. 16, is a side view of the griddle when installed showing some portions of the base.
Figure 18:
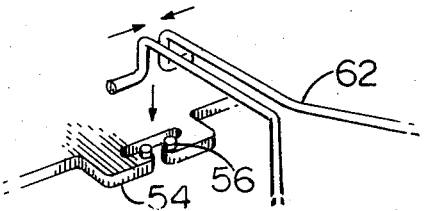
FIG. 18, is a partial perspective view of the handle and its attachment structure point on the griddle, shown partially.
Figure 19:
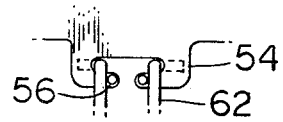
FIG. 19, is a partial top view of the handle attached to the griddle, shown partially.
Figure 20:
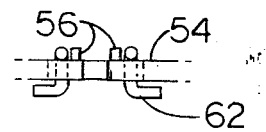
FIG. 20, is a partial side view further illustrating how the handle is attached to the griddle.

Pancakes and eggs may be cooked without the use of pans by utilizing the griddle 52 in place of the grill 50. The griddle 52 is designed with a flange that depends below from its bottom to fit snugly on the inside of the base 40 as shown in FIG. 16. This prevents any sliding when the griddle 52 is used. At one end of the griddle 52 there is a handle attachment structure 54, inclusive of retainers 56, which receives the removable handle 62, as shown in FIGS. 18, 19, and 20.

Food may be baked, roasted, steamed, or smoked by using the top cover 30, secured over the bottom cover 36, with the grill 50, supporting the food, located inside the oven space formed by the covers. This oven sub assembly is placed directly on the base 40 with the bottom surface of the bottom cover 36 protruding into the base 40 to secure its position. If smoking of the food is to be done, a few smoke chips 80 are placed beneath the grill 50. The top cover 30 is secured to bottom cover 36 by using the latch 38 mounted on the bottom cover 36 and pivoted into contact with the latch receiving attachment 34 on the top cover 30. In FIG. 21 the complementary beaded edge structures of the top cover 30 and bottom cover 36 are shown as they tightly meet to form an oven, which after the latches 38 are secured, will become a pressurized oven when heated.

Figure 8:
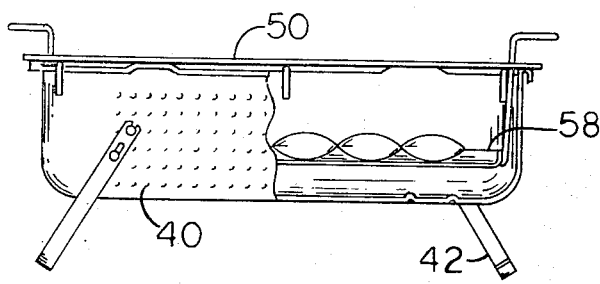
FIG. 8, is a side view of the cooking assembly being used as a charcoal broiler.

When charcoal broiling is desired, the propane burner assembly 64 and the propane fuel bottle 72 are removed from the base 40. In their place, the briquet carrier 58 is positioned inside the base 40 to receive charcoal. It is adjustable to many levels within the base 40 by utilizing the adjustable multiple offset supports 60 secured to the briquet carrier 58. To support food for broiling the grill 50 is placed above the base 40 in its normal position. As shown in FIGS. 7 and 8, the briquet carrier 58 and adjustment carrier 60 will be rested on the bottom of the base 40 until the grill 50 is positioned. Thereafter, the adjustable supports 60 are moved until their selected offset supports are secured to the grill 50, placing the charcoal carrier 58 at the selected distance below the grill 50.

The cutting board 74, insulated mittens 76, small spears 78, and the package of smoke chips 80 have all been designed to fit into the multipurpose cooking assembly 28, when it is to be carried or stored. Since they are frequently needed items for outdoor cooking, their inclusion into the cooking assembly 28 is more convenient for the user than having to carry such items separately.

From its easily portable and stored packed configuration of suitcase size, this multipurpose cooking assembly is immediately converted into any one selected operating configuration to undertake the cooking of food by using at any time a preferred method of cooking selected from many to prepare a specific food or group of foods. The initial cost and operating costs are low and within the budgets of all those persons who enjoy outdoor life and desire to make their outdoor eating a real pleasure.

I claim:

1. A portable multipurpose cooking facility assembly compactly carried and stored in a size comparable to a rectangular suitcase, inclusive of cooking aid accessories, and easily expanded into different configurations to be alternately used during various types of cooking operations, such as frying, pressure cooking, grilling, warming, toasting, roasting, boiling, and barbecuing, comprising:

a. a rectangular two piece cover when closed appearing as a small rectangular suitcase, having substantially alike separable top and bottom cover portions, each cover portion being hollow and each one being equipped with: a surrounding flange for the sealing abutment of one flange to the other flange of these cover portions; a portion of a closing latch on each cover portion, the portions being operable to secure the top and bottom cover portions together during both their storage and also their use as components of a pressure cooker; a removable suitcase like positioned handle on one cover portion; and outwardly projecting embossments on the major surface structure of each top and bottom cover which are useful in non slidably positioning either the separable top or bottom cover over a lower positioned supporting cooking base;

b. a supporting cooking base, storable with the rectangular two piece cover, having: four upright sides all having multiple small ventilation openings, a solid base having small upwardly projecting receivers, retractable and pivotable supporting legs, and an open top, sized to complementary fit the outwardly projecting embossments on the major surface structure of each top and bottom cover which may be placed on the supporting cooking base;

c. an assembly of gas burners and supply lines, removably interfitted with the small upwardly projecting receivers on the solid base of the supporting cooking base;

d. a removable propane gas container and valve for placement within the rectangular two piece cover when closed, and for placement alongside the cooking base when used, upon insertion into the supply lines of the gas burners;

e. a removable charcoal briquet carrier having multiple level position hangers at each end to fit at selected levels down into the supporting cooking base;

f. a removable griddle having a surrounding grease collection trough, a removable handle receiving structure to receive the suitcase like positioned handle used on one cover portion, and a surrounding ledge portion used to rest the removable griddle over the supporting cooking base;

g. a removable grill for placement within the rectangular two piece cover when closed, and for placement over the supporting cooking base when used, having depending portions formed to endwise slidably secure it in position; and h. an assortment of cooking accessories for placement within the rectangular two piece cover when closed, including a package of smoke producing wood chips, cutting board, insulated mittens, and skewers.

2. A portable multipurpose cooking facility assembly compactly carried and stored in a size comparable to a rectangular suitcase, inclusive of cooking aid accessories, and easily expanded into different configurations to be alternately used during various types of cooking operations, such as frying, pressure cooking, grilling, warming, toasting, roasting, boiling, and barbecuing, comprising:

a. a rectangular two piece cover when closed appearing as a small rectangular suitcase, having substantially alike separable top and bottom cover portions, each cover portion being hollow and each one being equipped with: a surrounding flange for the sealing abutment of one flange to the other flange of these cover portions; a portion of a closing latch on each cover portion, the portions being operable to secure the top and bottom cover portions together during both their storage and also their use as components of a pressure cooker; and outwardly projecting embossments on the major surface structure of each top and bottom cover which are useful in non slidably positioning either the separable top or bottom cover over a lower positioned supporting cooking base;

b. a supporting cooking base, storable with the rectangular two piece cover, having: four upright sides having ventilation openings, supporting legs, and an open top, sized to complementary fit the outwardly projecting embossments on the major surface structure of each top and bottom cover which may be placed on the supporting cooking base;

c. an assembly of gas burners and supply lines, storable within the rectangular two piece cover and removably placed on the solid base of the supporting cooking base;

d. a removable propane gas container and valve for placement within the rectangular two piece cover when closed, and for placement alongside the cooking base when used, upon insertion into the supply lines of the gas burners;

e. a removable charcoal briquet carrier having multiple level position hangers at each end to fit at selected levels down into the supporting cooking base;

f. a removable griddle having a surrounding ledge portion used to rest the removable griddle over the supporting cooking base;

g. a removable grill for placement within the rectangular two piece cover when closed, and for placement over the supporting cooking base when used; and h. an assortment of cooking accessories for placement within the rectangular two piece cover when closed, including a package of smoke producing wood chips, cutting board, insulated mittens, and skewers.

3. A portable multipurpose cooking facility assembly compactly carried and stored in a size comparable to a rectangular suitcase; inclusive of cooking aid accessories, and easily expanded into different configurations to be alternately used during various types of cooking operations, such as frying, pressure cooking, grilling, warming, toasting, roasting, boiling, and barbecuing, comprising:

a. a rectangular two piece cover when closed appearing as a rectangular suitcase, having substantially alike separable top and bottom cover portions, each cover portion being hollow and each one being equipped with: a surrounding flange for the sealing abutment of one flange to the other flange of these cover portions; closing fasteners for the covers being operable to secure the top and bottom cover portions together during both their storage and also their use as components of a pressure cooker;

b. a supporting cooking base, storable with the rectangular two piece cover, having: four upright sides having ventilation openings, and an open top, sized to complementary fit the top and bottom cover which may be placed on the supporting cooking base;

c. an assembly of a gas burner storable within the rectangular two piece cover and removably placed on the solid base of the supporting cooking base;

d. a removable propane gas container and valve for placement within the rectangular two piece cover when closed, and for placement alongside the cooking base when used, upon insertion into the supply lines of the gas burner;

e. a removable griddle having a surrounding ledge portion used to rest the removable griddle over the supporting cooking base; and f. a removable grill for placement within the rectangular two piece cover when closed, and for placement over the supporting cooking base when used.

* * * * *